United States Patent [19]

Kanda et al.

[11] Patent Number: 4,485,773
[45] Date of Patent: Dec. 4, 1984

[54] HELICALLY-SHAPED INTAKE PORT OF AN INTERNAL-COMBUSTION ENGINE

[75] Inventors: Mutsumi Kanda; Kiyoshi Nakanishi, both of Susono; Tokuta Inoue, Mishima, all of Japan

[73] Assignee: Toyota Jidosha Kabushiki Kaisha, Aichi, Japan

[21] Appl. No.: 495,595

[22] Filed: May 18, 1983

[30] Foreign Application Priority Data

Sep. 8, 1982 [JP] Japan .................. 57-155113
Sep. 10, 1982 [JP] Japan .................. 57-156839

[51] Int. Cl.³ ................................ F02F 1/42
[52] U.S. Cl. ...................... 123/188 M; 123/308
[58] Field of Search ............ 123/188 M, 52 M, 306, 123/308, 432

[56] References Cited

U.S. PATENT DOCUMENTS

| | | | |
|---|---|---|---|
| 3,850,479 | 11/1974 | Boyhont et al. | 302/29 |
| 3,884,209 | 5/1975 | List et al. | 123/188 M |
| 4,159,011 | 6/1979 | Sperry | 123/188 M |
| 4,174,686 | 11/1979 | Shimizu et al. | 123/308 |
| 4,201,165 | 5/1980 | Tanaka et al. | 123/568 |
| 4,246,874 | 1/1981 | Nakagawa et al. | 123/308 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,286,554 | 9/1981 | Okamoto | 123/188 M |
| 4,312,309 | 1/1982 | Nakanishi et al. | 123/188 M |
| 4,411,226 | 10/1983 | Okumura et al. | 123/188 M |
| 4,438,741 | 3/1984 | Okumura et al. | 123/188 M |

FOREIGN PATENT DOCUMENTS

| | | | |
|---|---|---|---|
| 2059008 | 6/1972 | Fed. Rep. of Germany . | |
| 143289 | 8/1980 | German Democratic Rep. | 123/188 M |
| 127113 | 9/1977 | Japan . | |
| 54-58129 | 5/1979 | Japan . | |
| 35177 | 3/1980 | Japan | 123/188 M |
| 56-54922 | 5/1981 | Japan . | |
| 57-68519 | 4/1982 | Japan . | |
| 183521 | 11/1982 | Japan | 123/306 |
| 28525 | 2/1983 | Japan | 123/306 |

Primary Examiner—Ira S. Lazarus
Attorney, Agent, or Firm—Parkhurst & Oliff

[57] ABSTRACT

An engine comprising an intake port which has a separating wall projecting downwardly from the upper wall of the intake port. The separating wall defines a helical portion, an inlet passage portion tangentially connected to the helical portion, and a bypass passage interconnecting the inlet passage portion and the helical portion. The intake port has a bottom wall having a transverse width which is approximately equal to the diameter of the valve head of the intake valve. The opposed peripheral edges of the bottom wall are located on the extensions of the tanget lines of the outer periphery of the valve head of the intake valve. A rotary valve is arranged in the bypass passage and is actuated by a vacuum-operated diaphragm apparatus. The rotary valve is opened when the amount of air fed into the cylinder of the engine is increased beyond a predetermined value.

24 Claims, 13 Drawing Figures

HELICALLY-SHAPED INTAKE PORT OF AN INTERNAL-COMBUSTION ENGINE

BACKGROUND OF THE INVENTION

The present invention relates to a helically-shaped intake port of an internal-combustion engine.

A helically-shaped intake port normally comprises a helical portion formed around the intake valve of an engine and a substantially straight inlet passage portion tangentially connected to the helical portion. However, if such a helically-shaped intake port is so formed that a strong swirling motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the present inventors previously proposed a helically-shaped intake port in which a bypass passage, branched off from the inlet passage portion and connected to the helix-terminating portion of the helical portion, is formed in the cylinder head of an engine. A flow control valve is arranged in the bypass passage and is open when the engine is operating under a heavy load at a high speed. In this helically-shaped intake port, when the engine is operating under a heavy load at a high speed, a part of the air introduced into the inlet passage portion is fed into the helical portion of the helically-shaped intake port via the bypass passage. Consequently, since the flow area of the intake port is increased when the engine is operating under a heavy load at a high speed, it is possible to increase the volumetric efficiency. However, in this helically-shaped intake port, since the bypass passage is formed by a tubular passage which is completely separated from the inlet passage portion, the bypass passage has a relatively great flow resistance. In addition, since it is necessary to form the bypass passage adjacent to the inlet passage portion, the cross-sectional area of the bypass passage is restricted by the presence of the inlet passage portion. Consequently, it is difficult to obtain a satisfactory high volumetric efficiency. In addition, the helically-shaped intake port has a complicated construction itself, and, thus, if a bypass passage completely separated from the inlet passage portion is additionally provided, the entire construction of the intake port becomes extremely complicated. Therefore, it is considerably difficult to form a helically-shaped intake port equipped with such a bypass passage in the cylinder head.

SUMMARY OF THE INVENTION

An object of the present invention is to provide a helically-shaped intake port having a novel construction which can be easily manufactured and which is capable of obtaining a high volumetric efficiency when the engine is operating under a heavy load at a high speed.

According to the present invention, there is provided an intake device of an internal-combustion engine comprising: an intake valve having a valve stem and a valve head; an axially extending intake port passage having an inlet opening at one end thereof and an outlet throat at the other end thereof, the intake port passage having a substantially cylindrically extending circumferential wall which circumferentially extends around the valve stem and expands outwardly from an outer periphery of the valve head of the intake valve, a first side wall which extends between the inlet opening and the circumferential wall along the axis of the intake port passage, a second side wall which extends between the inlet opening and the circumferential wall along the axis of the intake port passage and is arranged so that it faces the first side wall, an upper wall which extends between the inlet opening and the circumferential wall along the axis of the intake port passage, and a bottom wall which extends between the inlet opening and the outlet throat along the axis of the intake port passage and which has a transverse width which is approximately equal to the diameter of the valve head of the intake valve, the bottom wall having opposed peripheral edges at which the bottom wall is connected to the first side wall and the second side wall and which are located on tangent lines of the outer periphery of the valve head of the intake valve; a separating wall projecting downwardly from the upper wall and spaced from the bottom wall, the separating wall extending along the axis of the intake port passage and being spaced from the circumferential wall so as to define a helical portion having a helix-terminating portion between the separating wall and the circumferential wall, the separating wall being spaced from the first side wall so as to define therebetween an inlet passage portion tangentially connected to the helical portion, the separating wall being spaced from the second side wall so as to define therebetween a bypass passage which interconnects the inlet passage portion and the helix-terminating portion; normally closed valve means arranged in the bypass passage for controlling the flow area of the bypass passage; and actuating means for actuating the valve means in response to the change in the operating condition of the engine to open the valve means when the engine is operating at a high speed under a heavy load.

The present invention may be more fully understood from the description of a preferred embodiment thereof set forth below, together with the accompanying drawings.

DESCRIPTION OF THE PREFERRED EMBODIMENT

Figure 1:
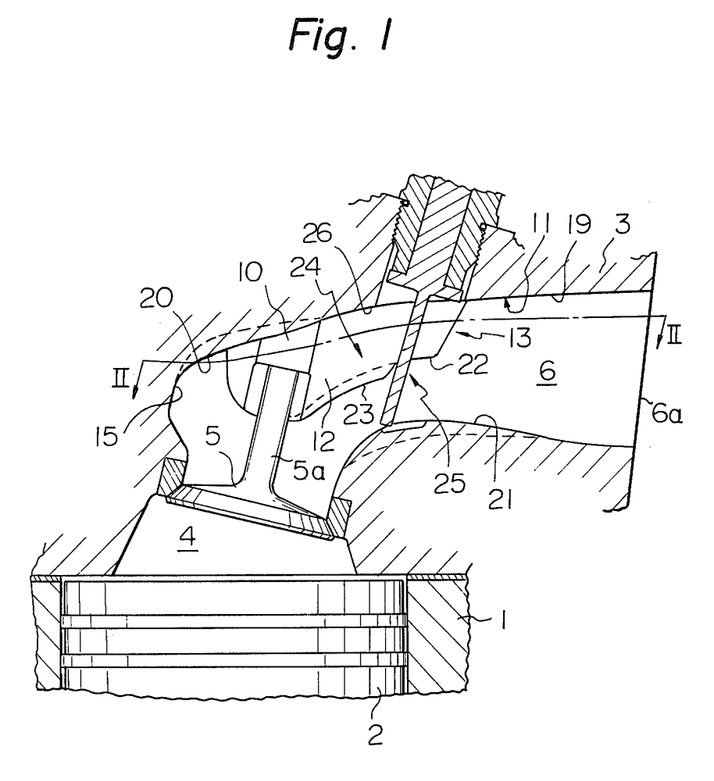
FIG. 1 is a cross-sectional side view along the line I—I in FIG. 2 of an internal-combustion engine according to the present invention.
Figure 2:
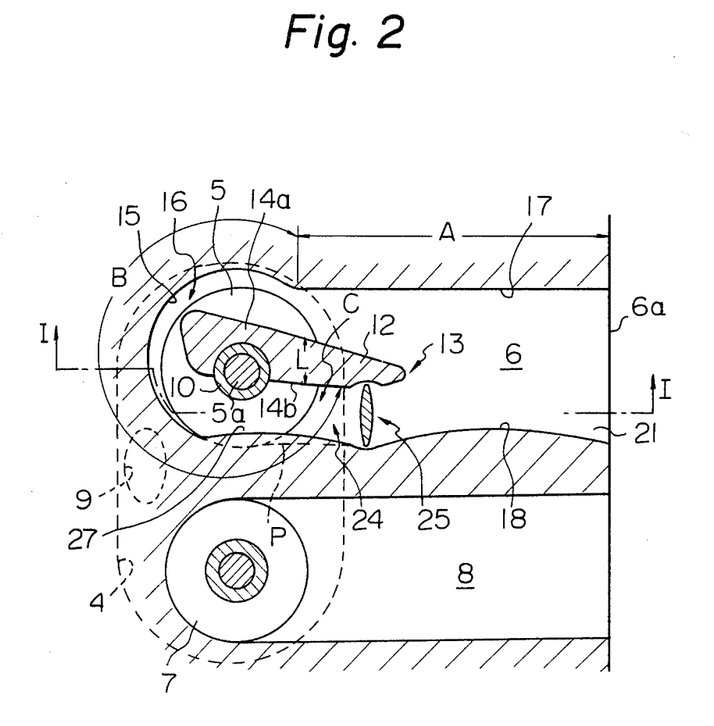
FIG. 2 is a cross-sectional plan view along the line II—II in FIG. 1 of the internal-combustion engine of FIG. 1.
Figure 3:
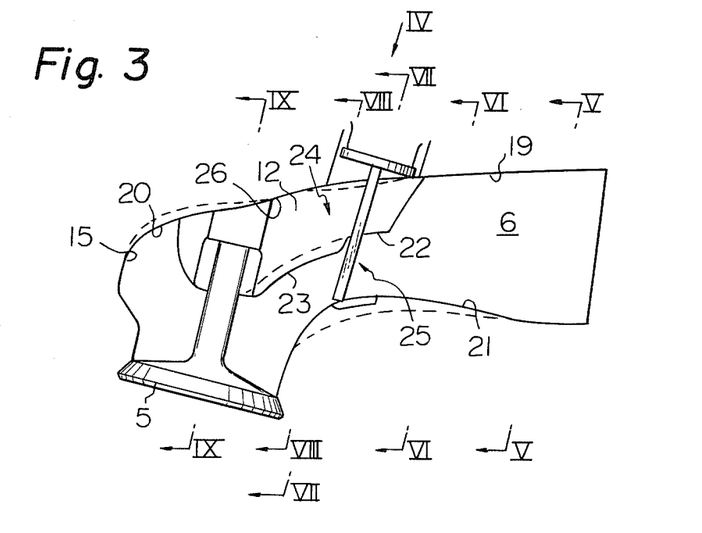
FIG. 3 is a side view of a helically-shaped intake port according to the present invention schematically illustrating the shape thereof.
Figure 4:
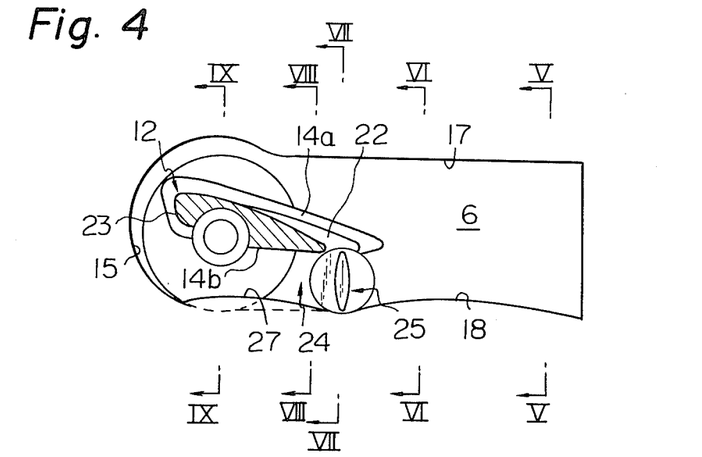
FIG. 4 is a plan view of a helically-shaped intake port according to the present invention schematically illustrating the shape thereof.

Referring to FIGS. 1 and 2, reference numeral 1 designates a cylinder block, 2 a piston reciprocally movable in the cylinder block 1, 3 a cylinder head fixed onto the cylinder block 1, 4 a combustion chamber formed between the piston 2 and the cylinder head 3, 5 an intake valve, 6 a helically-shaped intake port formed in the cylinder head 3, 7 an exhaust valve, 8 an exhaust port formed in the cylinder head 3, 9 a spark plug arranged in the combustion chamber 4, and 10 a stem guide for guiding the stem 5a of the intake valve 5. As is illustrated in FIGS. 1 and 2, a downwardly projecting separating wall 12 is formed in one piece on the upper wall 11 of the intake port 6, and the helical portion B and the inlet passage portion A tangentially connected to the helical portion B are formed by the separating wall 12. The separating wall 12 extends from the interior region of the inlet passage portion A to the region around the stem 5a of the intake valve 5. From FIG. 2, it will be understood that the width L of the root portion of the separating wall 12 is gradually increased as the measuring point of the width L approaches the stem guide 10 from the inlet passage poriton A. The separating wall 12 has a tip portion 13 near the inlet opening 6a of the intake port 6. In addition, the separating wall 12 comprises a first side wall 14a extending in a counterclockwise direction in FIG. 2 from the tip portion 13 to the stem guide 10 and a second side wall 14b extending in a clockwise direction is FIG. 2 from the tip portion 13 to the stem guide 10. The first side wall 14a extends near the stem guide 10 from the tip portion 13 to near the side wall 15 of the helical portion B, and the first side wall 14a and the side wall 15 define a narrow passage portion 16 therebetween. The first side wall 14a extends to the stem guide 10 while curving so that the first side wall 14a gradually moves away from the side wall 15 of the helical portion B. The second side wall 14b, which is substantially straight, extends from the tip portion 13 to the stem guide 10.

Figure 5:
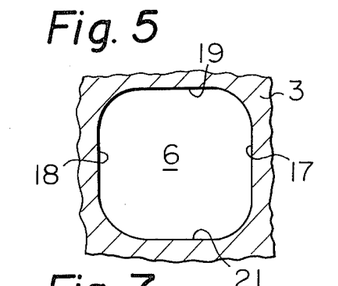
FIG. 5 is a cross-sectional view along the line V—V in FIGS. 3 and 4 of the intake port of FIGS. 3 and 4.
Figure 6:
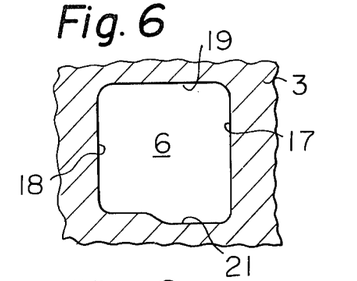
FIG. 6 is a cross-sectional view along the line VI—VI in FIGS. 3 and 4 of the intake port of FIGS. 3 and 4.
Figures 7, 8, 9, 10:
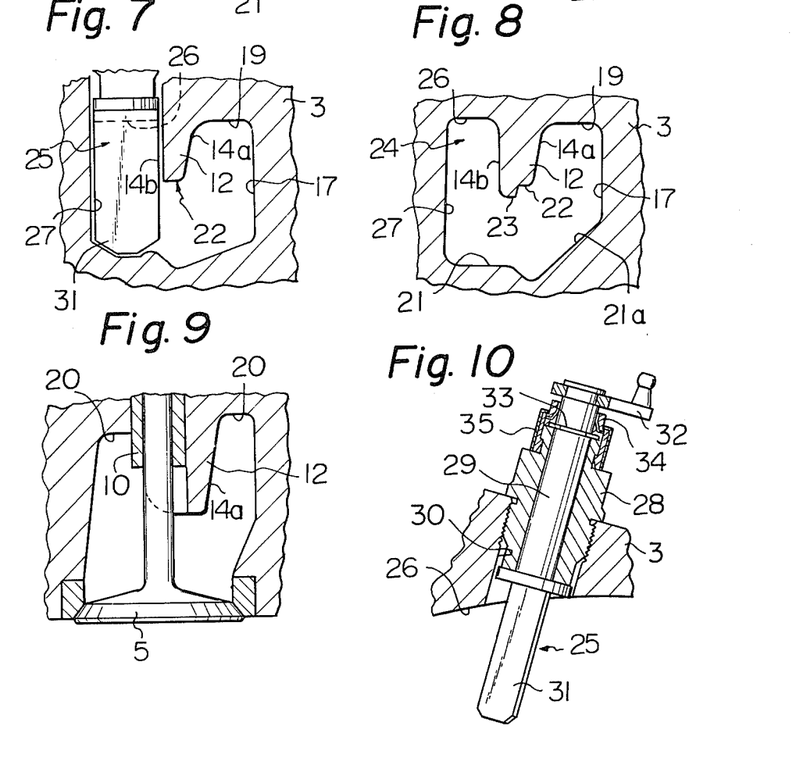
FIG. 7 is a cross-sectional view along the line VII—VII in FIGS. 3 and 4 of the intake port of FIGS. 3 and 4.
FIG. 8 is a cross-sectional view along the line VIII—VIII in FIGS. 3 and 4 of the intake port of FIGS. 3 and 4.
FIG. 9 is a cross-sectional view along the line IX—IX in FIGS. 3 and 4 of the intake port of FIGS. 3 and 4.
FIG. 10 is a cross-sectional side view of a rotary valve.

Referring to FIGS. 1 through 9, the side walls 17, 18 of the inlet passage portion A are substantially vertically arranged, and the upper wall 19 of the inlet passage portion A gradually descends towards the helical portion B. The side wall 17 of the inlet passage portion A extends on the tangent line of the outer periphery of the valve head of the intake valve 5 and is connected to the side wall 15 of the helical portion B. The side wall 15 of the helical portion B expands outwardly from the outer periphery of the valve head of the intake valve 5, and the side wall 17 of the inlet passage portion A and the side wall 15 of the helical portion B are interconnected at a certain angle. As is illustrated in FIG. 2, the side wall 18 of the inlet passage portion A has an inwardly expanding convex shape, and the upper wall 19 of the inlet passage portion A is smoothly connected to the upper wall 20 of the helical prtion B. The upper wall 20 of the helical portion B gradually descends towards the narrow passage portion 16 from the connecting portion of the inlet passage portion A and the helical portion B. In addition, the width of the upper wall 20 of the helical portion B is gradually reduced towards the narrow passage portion 16 from the connecting portion of the inlet passage portion A and the helical portion B. Then the width of the upper wall 20 is gradually increased towards the helix-terminatig portion C of the helical portion B from the narrow passage portion 16. The entire bottom wall 21 of the inlet passage portion A is substantially horizontally arranged near the inlet opening 6a (FIGS. 1 and 2) of the intake port 6, as is illustrated in FIG. 5. As the bottom wall 21 approaches the helical portion B, the bottom wall portion 21a located adjacent to the side wall 17 is gradually raised and forms an inclined face, as is illustrated in FIG. 8. The inclined angle of the bottom wall portion 21a is gradually increased towards the helical portion B.

The first side wall 14a of the separating wall 12 is slightly inclined so as to be directed downward, and the second side wall 14b is substantially vertically arranged. The bottom face 22 of the separating wall 12 descends, while slightly curving, towards the helical portion B from the inlet passage portion A so that the distance between the bottom face 22 of the separating wall 12 and the upper wall 19 of the inlet passage portion A is gradually increased towards the stem guide 10 from the tip portion 13. A downwardly projecting rib 23 is formed on the bottom face 22 of the separating wall 12 in the region indicated by the hatching in FIG. 4, and the bottom face of the rib 23 and the bottom face 22 form a slightly curved and inclined face.

A bypass passage 24, interconnecting the inlet passage portion A and the helix-terminating portion C of the helical portion B, is formed in the cylinder head 3, and a rotary valve 25 is arranged in the inlet portion of the bypass passage 24. The bypass passage 24 is separated from the inlet passage portion A by the separating wall 12, and the lower space of the bypass passage 24 is in communication with the inlet passage portion A over the entire length of the bypass passage 24. The upper wall 26 of the bypass passage 24 has an approximately uniform width. The upper wall 26 gradually descends towards the helix-terminating portion C and is smoothly connected to the upper wall 20 of the helical portion B. The side wall 27 of the bypass passage 24, which faces the second side wall 14b of the separating wall 12, is slightly inclined so as to be directed downward and is located approximately on the extension of the side wall 18 of the inlet passage portion A. The intersecting line between the side wall 27 and the bottom wall 21, that is, one of the peripheral edges of the bottom wall 21, extends so as to be tangentially connected to the outer periphery of the valve head of the intake valve 5, as is illustrated by the broken line P in FIG. 2, and, thus, the inclined side wall 27 projects into a space located above the outer periphery of the valve head of the intake valve 5. From FIG. 2, it will be understood that the transverse width of the bottom wall 21 is approximately equal to the diameter of the intake valve 5 and that the opposed peripheral edges of the bottom wall 21 are located on the corresponding tangent lines of the outer periphery of the valve head of the intake valve 5.

As is illustrated in FIG. 10, the rotary valve 25 comprises a rotary valve holder 28 and a valve shaft 29 rotatably supported by the rotary valve holder 28. The rotary valve holder 28 is screwed into a valve insertion bore 30 formed in the cylinder head 3. A thin plate-shaped valve body 31 is formed on the lower end of the valve shaft 29 and extends between the bottom wall 21 of the inlet passage portion A and the upper wall 26 of the bypass passage 24, as is illustrated in FIG. 1. An arm 32 is fixed onto the top end of the valve shaft 29. A ring groove 33 is formed on the outer circumferential wall of the valve shaft 29, and an E-shaped positioning ring 34 is fitted into the ring groove 33. In addition, a seal member 35 is fitted onto the upper portion of the rotary valve holder 28, and the seal member 35 seals the valve shaft 29.

Figure 11:
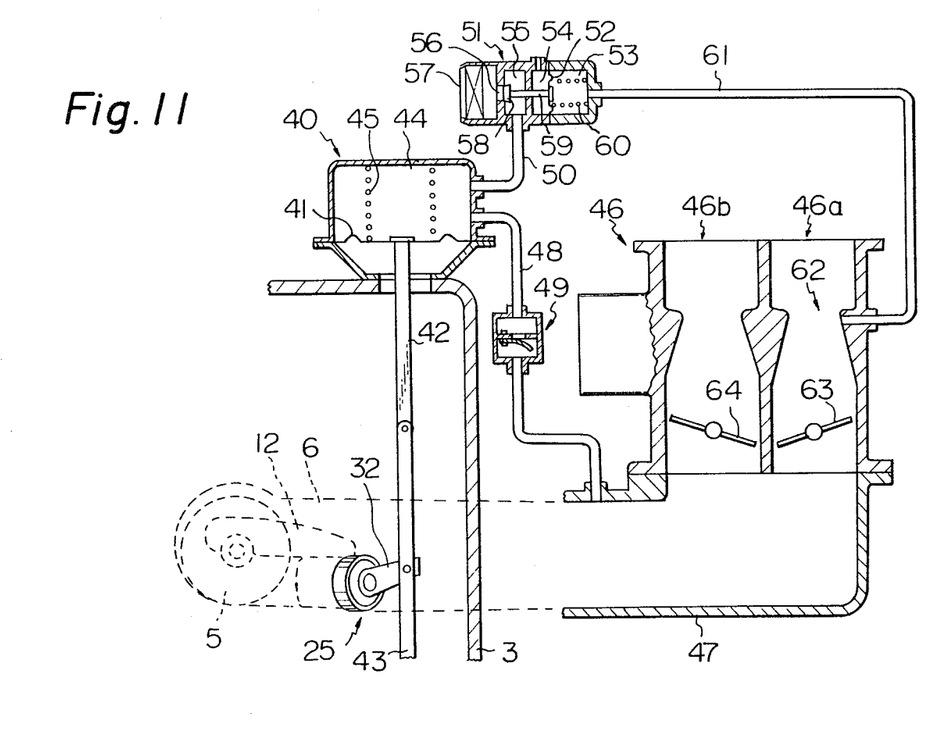
FIG. 11 is a view of rotary valve drive control device.

Referring to FIG. 11, the tip of the arm 32 fixed onto the top end of the rotary valve 25 is connected via a connecting rod 43 to a control rod 42 which is fixed onto a diaphragm 41 of a vacuum-operated diaphragm apparatus 40. The diaphragm apparatus 40 comprises a vacuum chamber 44 separated from the atmosphere by the diaphragm 41, and a compression spring 45 for biasing the diaphragm 41 is inserted into the vacuum chamber 44.

An intake manifold 47, equipped with a compound-type carburetor 46 comprising a primary carburetor 46a and a secondary carburetor 46b, is mounted on the cylinder head 3, and the vacuum chamber 44 is connected to the interior of the intake manifold 47 via a vacuum conduit 48. A check valve 49, permitting air to flow from the vacuum chamber 44 into the intake manifold 47, is arranged in the vacuum conduit 48. In addition, the vacuum chamber 44 is connected to the atmosphere via an atmosphere conduit 50 and a control valve 51. The control valve 51 comprises a vacuum chamber 53 and an atmospheric pressure chamber 54 which are separated by a diaphragm 52. In addition, the control valve 51 further comprises a valve chamber 55 arranged adjacent to the atmospheric pressure chamber 54. The valve chamber 55 is connected at one end to the vacuum chamber 44 via the atmosphere conduit 50 and at the other end to the atmosphere via a valve port 56 and an air filter 57. A valve body 58, controlling the opening operation of the valve port 56, is arranged in the valve chamber 55 and is connected to the diaphragm 52 via a valve rod 59. A compression spring 60 for biasing the diaphragm 52 is inserted into the vacuum chamber 53, and the vacuum chamber 53 is connected to a venturi portion 62 of the primary carburetor 46a via a vacuum conduit 61.

The carburetor 46 is a conventional carburetor. Consequently, when the opening degree of a primary throttle valve 63 is increased beyond a predetermined degree, a secondary throttle valve 64 is opened. When the primary throttle valve 63 is fully opened, the secondary throttle valve 64 is also fully opened. The level of vacuum produced in the venturi portion 62 of the primary carburetor 46a is increased as the amount of air fed into the cylinder of the engine is increased. Consequently, when a great vacuum is produced in the venturi portion 62, that is, when the engine is operating at a high speed under a heavy load, the diaphragm 52 of the control valve 51 moves towards the right in FIG. 11 against the compression spring 60. As a result, the valve body 58 opens the valve port 56. Thus, the vacuum chamber 44 of the diaphragm apparatus 40 becomes open to the atmosphere. At this time, the diaphragm 41 moves downward in FIG. 11 due to the spring force of the compression spring 45, and, thus, the rotary valve 25 is rotated and fully opens the bypass passage 24.

On the other hand, in the case wherein the opening degree of the primary throttle valve 63 is small, since the vacuum produced in the venturi portion 62 is small, the diaphragm 52 of the control valve 51 moves towards the left in FIG. 11 due to the spring force of the compression spring 60. As a result, the valve body 58 closes the valve port 56. In addition, in the case wherein the opening degree of the primary throttle valve 63 is small, a great vacuum is produced in the intake manifold 47. Since the check valve 49 opens when the level of vacuum produced in the intake manifld 47 becomes greater than that of the vacuum produced in the vacuum chamber 44 and since the check valve 49 closes when the level of the vacuum produced in the intake manifold 47 becomes less than that of the vacuum produced in the vacuum chamber 44, the level of the vacuum in the vacuum chamber 44 is maintained at the maximum vacuum level in the intake manifold 47 as long as the control valve 51 remains closed. If a vacuum is produced in the vacuum chamber 44, the diaphragm 41 moves upward in FIG. 11 against the compression spring 45. As a result, the rotary valve 25 is rotated and closes the bypass passage 24. Consequently, when the engine is operating at a low speed under a light load, the bypass passage 24 is closed by the rotary valve 25. In the case wherein the engine speed is low even if the engine is operating under a heavy load and in the case wherein the engine is operating under a light load even if the engine speed is high, since the vacuum produced in the venturi portion 62 is small, the control valve 51 remains closed. Consequently, when the engine is operating at a low speed under a heavy load and at a high speed under a light load, since the level of the vacuum in the vacuum chamber 44 is maintained at the above-mentioned maximum level, the bypass passage 24 is closed by the rotary valve 25.

As was mentioned above, when the engine is operating at a low speed under a light load, that is, when the amount of air fed into the cylinder of the engine is small, the rotary valve 25 closes the bypass passage 24. At this time, a part of the mixture introduced into the inlet passage portion A moves forward along the upper walls 19, 20. In addition, at this time, a part of the remaining mixture impinges upon the rotary valve 25, and the flow direction thereof is deflectd towards the side wall 17 of the inlet passage portion A. Then the part of the remaining mixture flows along the side wall 15 of the helical portion B. As was mentioned above, since the widths of the upper walls 19, 20 are gradually reduced towards the narrow passage portion 16, the cross section of the flow path of the mixture flowing along the upper walls 19, 20 is gradually reduced towards the narrow passage portion 16. Thus, the velocity of the mixture flowing along the upper walls 19, 20 is gradually increased. In addition, as was mentioned above, since the first side wall 14a of the separating wall 12 extends to near the side wall 15 of the helical portion B, the mixture flowing along the upper walls 19, 20 is led onto the side wall 15 of the helical portion B and then moves forwards along the side wall 15. As a result, a strong swirling motion is created in the helical portion B. Then the swirling mixture flows into the combustion chamber 4 via the valve gap formed between the intake valve 5 and its valve seat and causes a strong swirling motion in the combustion chamber 4.

When the engine is operating at a high speed under a heavy load, that is, when the amount of air fed into the cylinder of the engine is large, since the rotary valve 25 opens the bypass passage 24, the mixture introduced into the inlet passage portion A is divided into three mixture streams. That is, the first mixture stream is a mixture stream which flows into the intake port 6 between the first side wall 14a of the separating wall 12 and the side wall 17 of the inlet passage portion A and then flows, while swirling, along the upper wall 20 of the helical portion B. The second mixture stream is a mixture stream which flows into the helical portion B through the bypass passage 24. The third mixture stream is a mixture stream which flows into the helical portion B along the bottom wall 21 of the inlet passage portion A. The flow resistance of the bypass passage 24 is smaller than that of the flow path formed between the first side wall 14a and the side wall 17, and, thus, the amount of the second mixture stream is larger than that of the first mixture stream. In addition, the flow direction of the first mixture stream which flows, while swirling, within the helical portion B is deflected downward by the second mixture stream, and, thus, the swirling motion of the first mixture stream is weakened. As was mentioned above, since the amount of the mixture which flows within the bypass passage 24 having a small flow resistance is increased and since the flow direction of the first mixture stream is deflected downward, it is possible to obtain a high volumetric efficiency. In addition, as was mentioned above, since the bottom face 22 of the separating wall 12 is inclined so as to be directed downward, the third mixture stream is guided by the bottom face 22 of the separating wall 12 so that the flow direction of the third mixture stream is deflected downward. Furthermore, since the side wall 27 of the bypass passage 24 downstream of the rotary valve 25 is inclined so as to be directed downward, the flow direction of the second mixture stream is also deflected downward. Thus, it is possible to obtain a further high volumetric efficiency.

In order to increase the volumetric efficiency, it is necessary to reduce the flow resistance of the intake port 6 as much as possible. In order to reduce the flow resistance of the intake port 6, it is necessary to form the intake port 6 so that it extends as straight as possible and so that the change in the cross-sectional area of the intake port 6 along the axis thereof is as small as possible. Obviously, if the intake port 6 is formed so that it extends straight, the flow resistance thereof is small. On the other hand, according to the theory of hydrodynamics, if the cross-sectional area of the flow path is increased, the velocity distribution becomes uniform but the pressure is increased. Consequently, in the case where the pressure difference between the vacuum in the inlet of the intake port and the vacuum in the outlet of the intake port 6 is maintained constant, if the cross-sectional area of the flow path in the intake port 6 is enlarged, the flow rate of the mixture is reduced, that is, the flow resistance of the intake port 6 is increased. In addition, if the cross-sectional area of the flow path downstream of the above-mentioned enlarged cross-sectional area region is restricted, flow energy is lost, and, thus, the flow resistance of the intake port 6 is further increased. Therefore, in order to reduce the flow resistance of the intake port 6, it is necessary to form the intake port 6 so that the change in the cross-sectional area thereof along the axis thereof is as small as possible. Consequently, the volumetric efficiency is maximum when a so-called straight port, extending straight and having a uniform cross section, is adopted as the intake port 6.

In the intake port 6 according to the present inventin, since the separating wall 12 projects into the intake port 6, the flow resistance of the intake port 6 is large as compared with a straight port. However, in the helically-shaped intake port 6 according to the present invention, when the rotary valve 25 is opened, if the axis of the flow path of the intake port 6 is straight and the change in the cross-sectional area of the flow path along the axis thereof is small, it is possible to reduce the flow resistance of the intake port 6 so that it approaches the flow resistance of a straight port. Consequently, in the helically-shaped intake port 6, as is illustrated in FIG. 2, the bottom wall 21 is formed so that the opposed peripheral edges thereof are located on the tangent lines of the outer periphery of the valve head of the intake valve 5, and the intake port 6 is formed so that the axis of the flow path thereof passes through the stem 5a of the intake valve 5.

Figure 12:
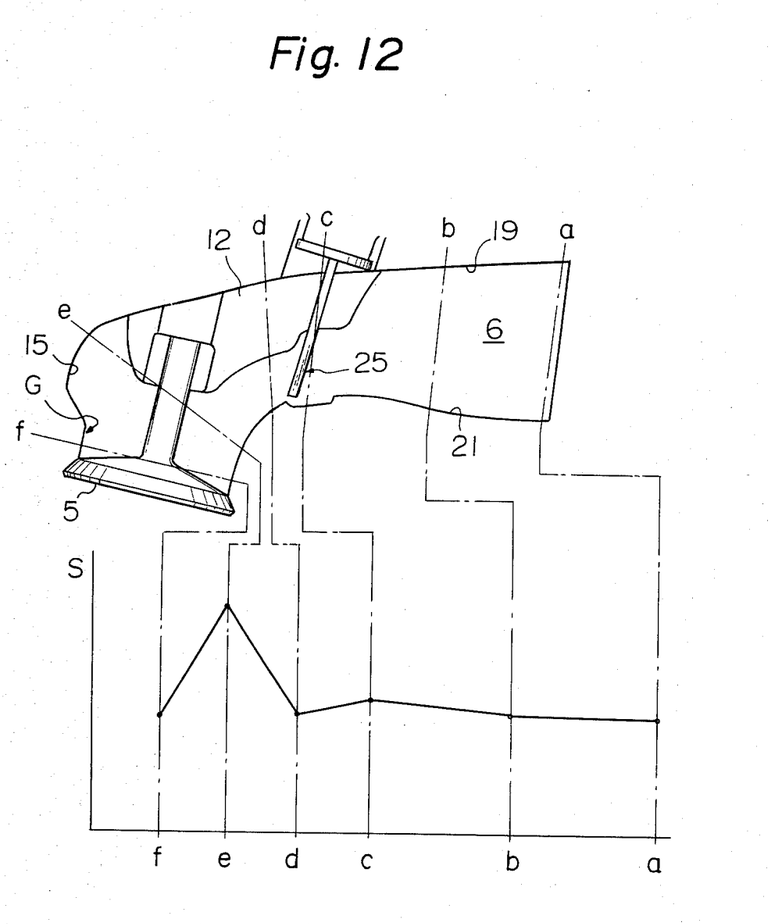
FIG. 12 is a diagram illustrating the cross-sectional areas of various cross sections of the intake port of FIGS. 3 and 4.
Figure 13:
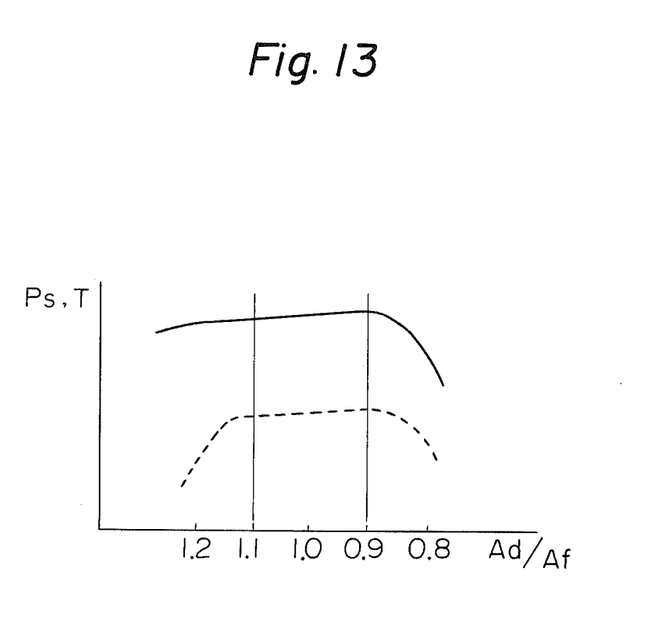
FIG. 13 is a diagram illustrating the maximum output power and the torque of the engine.

FIG. 12 illustrates the cross-sectional area S of each of the cross sections a, b, c, d, e, and f. From FIG. 12, it will be understood that the cross-sectional areas S of the cross sections a, b, c, and d are approximately equal to the cross-sectional area S of the cross section f of the mixture outlet throat G of the intake port 6. According to the experiments conducted by the invertors, among the cross sections a, b, c, d, e, and f, the cross-sectional area S of the cross section d of the downstream end portion of the inlet passage portion A has the most influnce on volumetric efficiency. The results of the above-mentioned experiments are illustrated in FIG. 13. In FIG. 13, the ordinates Ps and T indicate the maximum output power and the output torque of the engine, respectively, and the abscissa Ad/Af indicates the ratio of the cross-sectional area Ad of the cross section d to the cross-sectional area Af of the cross section f. In addition, in FIG. 13, the solid line indicates the relationship between the maximum output power Ps and the ratio Ad/Af in the case where the engine is operating at a high speed under a full load, and the broken line indicates the relationship between the output torque T and the ratio Ad/Af in the case where the engine is operating at a low speed under a full load. From FIG. 13, it will be understood that in order to obtain a high maximum output power Ps and output torque T, it is necessary to determine the shape of the intake port 6 so that the ratio Ad/Af is in the range of from 0.9 through 1.1, that is, the cross-sectional area Ad is approximately equal to the cross-sectional area Af.

According to the present invention, by forming the intake port 6 so that the axis of the flow path of the intake port 6 extends straight and passes through the stem 5a of the intake valve 5 when the rotary valve 25 is open and so that the opposed peripheral edges of the bottom wall 21 of the inlet passage prtion A are located on the tangent lines of the outer periphery of the valve head of the intake valve 5, the shape of the intake port 6 is almost the same as the shape of a straight port. In addition, by forming the intake port 6 so that the cross-sectional areas of various cross sections of the intake port 6 are as uniform as possible, the flow resistance of the intake port 6 is very similar to the flow resistance of a straight port. As a result, even if the separating wall 12 projects into the intake port 6 in order to create a strong swirling motion, it is possible to obtain a high volumetric efficiency.

While the invention has been described with reference to a specific embodiment chosen for purposes of illustrating, it should be apparent that numerous modifications could be made thereto by those skilled in the art without departing from the basic concept and scope of the invention.

We claim:

1. An intake device of an internal-combustion engine comprising:

an intake valve having a valve stem and a valve head; an axially extending intake port passage having an inlet opening at one end thereof and an outlet throat at the other end thereof, said intake port passage having a substantially cylindrically extending circumferential wall which circumferentially extends around said valve stem and expands outwardly from an outer periphery of the valve head of said intake valve, a first side wall which extends between said inlet opening and said circumferential wall along the axis of said intake port passage, a second side wall which extends between said inlet opening and said circumferential wall along the axis of said intake port passage and is arranged so that it faces said first side wall, an upper wall which extends between said inlet opening and said circumferential wall along the axis of said intake port passage, and a bottom wall which extends between said inlet opening and said outlet throat along the axis of said intake port passage and which has a transverse width which is approximately equal to the diameter of the valve head of said intake valve, said bottom wall having opposed peripheral edges at which said bottom wall is connected to said first side wall and said second side wall and which are located on tangent lines of the outer periphery of the valve head of said intake valve;

a separating wall projecting downwardly from said upper wall and spaced from said bottom wall, said separating wall extending along the axis of said intake port passage and being spaced from said circumferential wall so as to define a helical portion having a helix-terminating portion between said separating wall and said circumferential wall, said separating wall being spaced from said first side wall so as to define therebetween an inlet passage portion tangentially connected to said helical portion, said separating wall being spaced from said second side wall so as to define therebetween a bypass passage which interconnects said inlet passage portion and said helix-terminating portion;

normally closed valve means arranged in said bypass passage for controlling the flow area of said bypass passage; and actuating means for actuating said valve means in response to the change in the operating condition of the engine to open said valve means when the engine is operating at a high speed under a heavy load.

2. An intake device according to claim 1, wherein the sum of the cross-sectional areas of said inlet passage prtion and said bypass passage is approximately equal to a cross-sectional area of said outlet throat over the entire length of said inlet passage portion and said bypass passage.

3. An intake device according to claim 1, wherein a downwardly projecting rib is formed on a bottom face of said separating wall and extends towards said helical portion from said valve means.

4. An intake device according to claim 3, wherein said rib extends towards said helical portion from a position downstream of and near said valve means.

5. An intake device according to claim 1, wherein the axis of said intake port passage passes through said valve stem.

6. An intake device according to claim 1, wherein said separating wall has a bottom face spaced from the bottom wall of said intake port passage and gradually moving away from the upper wall of said intake port passage as the bottom face of said separating wall approaches said helical portion.

7. An intake device according to claim 1, wherein said separating wall has a transverse width which is gradually increased towards said helical portion.

8. An intake device according to claim 1, wherein said separating wall extends to near said circumferential wall so as to define a narrow passage portion therebetween.

9. An intake device according to claim 8, wherein said upper wall, located between said separating wall and said circumferential wall, has a width which is gradually increased from said narrow passage portion towards said helix-terminating portion.

10. An intake device according to claim 1, wherein said separating wall has an inclined side wall defining said inlet passage portion and directed downward.

11. An intake device according to claim 1, wherein said separating wall has a substantially vertical side wall defining said bypass passage, said second side wall being slightly inclined so as to be directed downward in a region of said bypass passage.

12. An intake device according to claim 1, wherein said second side wall projects into said helical portion located above the outer periphery of the valve head of said intake valve.

13. An intake device according to claim 1, wherein said second side wall has an inwardly expanding convex shape in a region of said inlet passage portion.

14. An intake device according to claim 1, wherein said circumferential wall and said first side wall are interconnected at a certain angle.

15. An intake device according to claim 1, wherein said bottom wall has an inclined portion located adjacent to said first side wall, the inclined angle of said inclined portion being gradually increased towards said helical portion.

16. An intake device according to claim 1, wherein said bypass passage has an inlet portion which is open to said inlet passage portion, said valve means being arranged in said inlet portion.

17. An intake device according to claim 1, wherein said valve means comprises a rotary valve rotatably arranged in said bypass passage.

18. An intake device according to claim 17, wherein said rotary valve has a thin plate-shaped valve body extending between said upper wall and said bottom wall.

19. An intake device according to claim 18, wherein said valve body has a width which is substantially equal to the transverse width of said bypass passage.

20. An intake device according to claim 1, wherein said actuating means actuates said valve means in response to the amount of air fed into said intake port passage and opens said valve means when said amount of air is increased beyond a predetermined value.

21. An intake device according to claim 20, wherein said actuating means comprises a vacuum chamber, a diaphragm connected to said rotary valve and actuated in response to a change in the level of the vacuum in said vacuum chamber, and a control apparatus maintaining the level of the vacuum in said vacuum chamber at the maximum level in the intake port passage when the amount of air fed into the intake port passage is smaller than said predetermined value and connecting said vacuum chamber to the atmosphere when said amount of air is larger than said predetermined value.

22. An intake device according to calim 21, wherein said control apparatus comprises a check valve arranged between the intake port passage and said vacuum chamber for allowing only the outflow of air from said vacuum chamber and a control valve for controlling the fluid connection between said vacuum chamber and the atmosphere so as to connect said vacuum chamber to the atmosphere when said amount of air is larger than said predetermined value.

23. An intake device according to claim 22, wherein the engine comprises a carburetor connected to the intake port passage and having a venturi portion, said control valve being actuated in response to a change in the level of the vacuum produced in said venturi portion.

24. An intake device according to claim 23, wherein said control valve comprises a valve body for controlling the fluid connection between said vacuum chamber and the atmosphere, a vacuum cavity connected to said venturi portion, and a diaphragm connected to said valve body and actuated in response to a change in the level of the vacuum produced in said vacuum cavity.

* * * * *